US006775782B1

(12) United States Patent
Buros et al.

(10) Patent No.: US 6,775,782 B1
(45) Date of Patent: Aug. 10, 2004

(54) SYSTEM AND METHOD FOR SUSPENDING AND RESUMING DIGITAL CERTIFICATES IN A CERTIFICATE-BASED USER AUTHENTICATION APPLICATION SYSTEM

(75) Inventors: Karen Lynn Buros, Austin, TX (US); Bryan Douglas Dobbs, Austin, TX (US); Ann Mizell Robinson, Round Rock, TX (US); Robert James Knaus, Lakeway, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,681

(22) Filed: Mar. 31, 1999

(51) Int. Cl.[7] .............................. H04L 9/00; G06F 1/24
(52) U.S. Cl. ....................... 713/201; 713/155; 713/156; 713/170; 713/171; 713/201; 713/202; 709/219; 709/229; 705/44; 380/30
(58) Field of Search ................................ 713/155, 171, 713/201, 202, 170, 156, 157; 380/25, 30; 705/44; 709/229, 219

(56) References Cited

U.S. PATENT DOCUMENTS

| | | | | | |
|---|---|---|---|---|---|
| 5,659,616 A | * | 8/1997 | Sudia | ........................ | 380/23 |
| 5,774,552 A | * | 6/1998 | Grimmer | .................... | 380/25 |
| 5,903,882 A | * | 5/1999 | Asay et al. | .................. | 705/44 |
| 6,044,462 A | * | 3/2000 | Zubeldia et al. | ............ | 713/155 |
| 6,088,805 A | * | 7/2000 | Davis et al. | ................ | 713/202 |
| 6,105,131 A | * | 8/2000 | Carroll | ....................... | 713/155 |
| 6,275,941 B1 | * | 8/2001 | Satio et al. | ................. | 713/201 |
| 6,516,316 B1 | * | 2/2003 | Ramasubramani et al. | | |

* cited by examiner

Primary Examiner—Ayaz Sheikh
Assistant Examiner—Taghi Arani
(74) Attorney, Agent, or Firm—Duke W. Yee; Jeffrey S. LaBaw; Cathrine K. Kinslow

(57) ABSTRACT

A method and system for certificating and authenticating an identity of a customer of a financial institution using digital certificates is provided. The customer and the financial institution communicate via a communications medium. The financial institution receives a digital registration request from the customer and verifies the identity of the customer by reconciling identification data in the digital registration request with identification data in a customer data structure at the financial institution. Responsive to verifying the identity of the customer, the financial institution generates a digital certificate and sends the digital certificate to the customer. When the customer desires access to an on-line application at the financial institution, the customer sends the previously issued digital certificate to the financial institution via the communications link. The financial institution authenticates the digital certificate and grants on-line application access based upon the authenticated digital certificate. The digital certificate may be suspended without being revoked by associatively storing certificate-state information with the distinguished name of the certificate owner, thereby providing a mechanism for suspending and resuming access privileges of the customer.

19 Claims, 12 Drawing Sheets

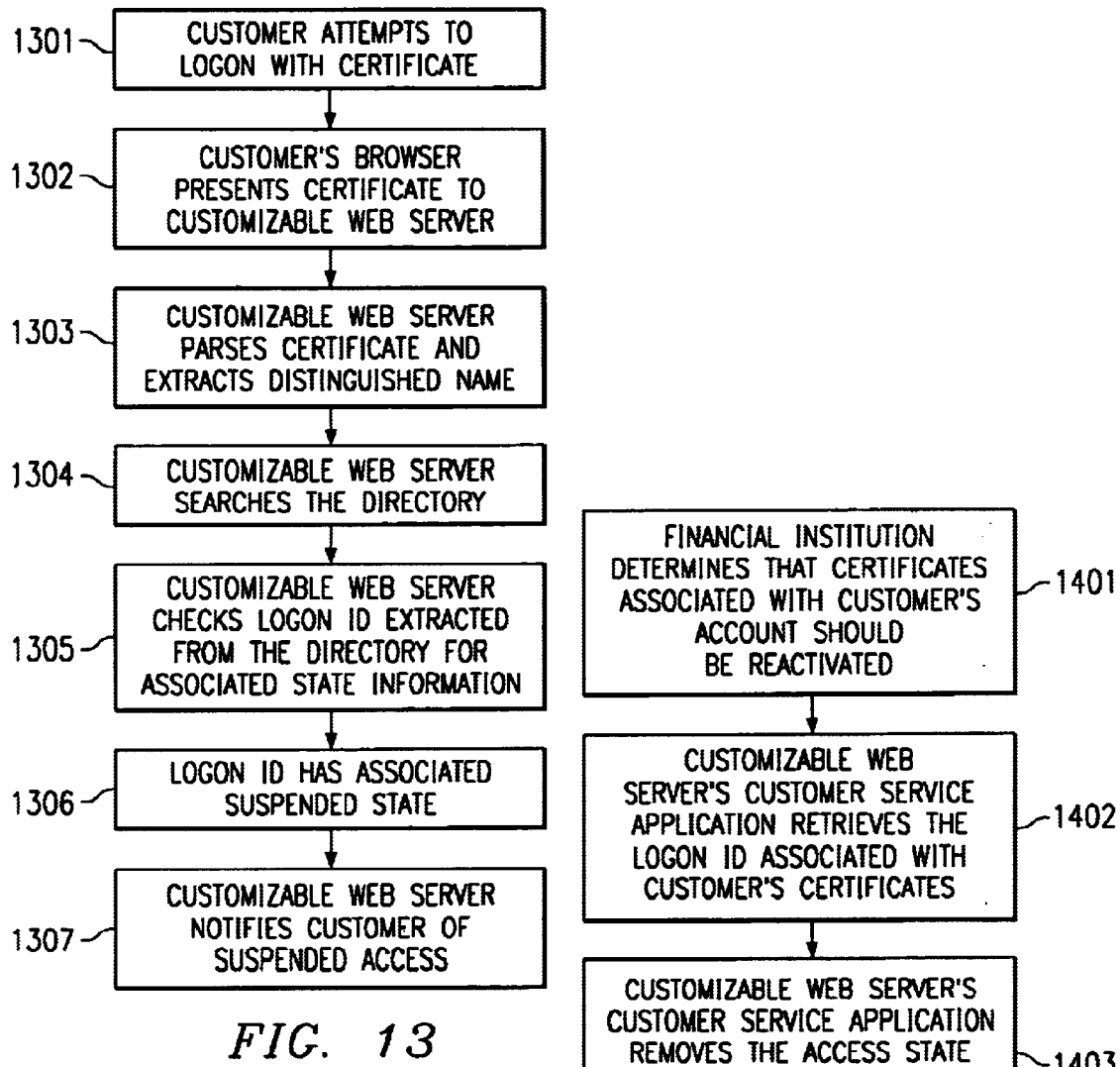

SYSTEM AND METHOD FOR SUSPENDING AND RESUMING DIGITAL CERTIFICATES IN A CERTIFICATE-BASED USER AUTHENTICATION APPLICATION SYSTEM

CROSS-REFERENCE TO RELATED APPLICATIONS

The present application is related to application Ser. No. 09/282,683, filed (concurrently herewith), titled "System and Method for Certificate-Based User Authentication in a Data Processing System," hereby incorporated by reference.

BACKGROUND OF THE INVENTION

1. Technical Field

The present invention relates generally to an improved data processing system and, in particular, to a method and system for authenticating a user of a data processing system before providing access to the data processing system to the user.

2. Description of Related Art

A certificate is a digital document that vouches for the identity and key ownership of an individual, a computer system, a specific server running on that system, or an organization. For example, a user's certificate verifies that the user owns a particular public key.

Certificates are issued by certificate authorities. These authorities are responsible for verifying the identity and key ownership of the individual before issuing the certificate.

An identity certificate is a digitally signed statement from one entity, saying that the public key of some other-entity has some particular value.

Public keys are numbers associated with a particular entity, and are intended to be known to everyone who needs to have trusted interactions with that entity.

An entity is a person, organization, program, computer, business, bank, etc.

If some data is digitally signed, it has been stored with the "identity" of an entity and a signature that proves that entity knows about the data.

A signature is computed from some data and the private key of an entity.

Private keys are numbers that are supposed to be known only to a particular entity, i.e. kept secret. In a typical public key cryptographic system, a private key corresponds to exactly one public key.

Certificates rely on public key cryptographic systems in which (a) private and public keys are paired, (b) private keys are used to sign, and (c) public keys are used to verify signatures.

A certificate authority (CA) is an entity (e.g., a business) that is trusted to sign (issue) certificates for other people (entities). It usually has some kind of legal responsibilities for its vouching of the binding between a public key and its owner that allow one to trust the entity that signed a certificate. There are many such certificate authorities, such as VeriSign, Entrust, etc.

Probably the most widely visible application of certificates today is in Web browsers, such as Netscape Navigator that support the SSL protocol. SSL (Secure Socket Layer) is a security protocol that provides privacy and authentication in network traffic. Browsers can only use this protocol with Web servers that support it.

Other technologies that rely on certificates include: various secure e-mail standards, such as Secure/Multipurpose Internet Mail Extensions (S/MIME); e-commerce protocols, such as Secure Electronic Transaction (SET); and various code-signing schemes, such as Microsoft AuthentiCode and signed Java Archives (JAR files).

There are two basic techniques used to get certificates: (1) make one oneself using the proper software, or (2) ask someone else, such as a certificate authority, to issue one. There are two main inputs to the certificate creation process. The first input is a pair of matched public and private keys generated using some special software. Only the public key is ever shown to anyone else. The private key is used to sign data; if someone improperly knows a private key, they can forge legal documents attributed to a third party. The second input is information about the entity being certified, such as an individual. This normally includes information such as a name and organization address. If a certificate authority issues a certificate, one will normally need to provide proof of identity.

If a certificate authority issues a certificate for an individual, the individual must provide a public key and some information about himself. A tool, such as Netscape Navigator 3.0, may digitally sign this information and send it to the certificate authority. The certificate authority might be a company like VeriSign that provides trusted third-party certificate authority services. The certificate authority will then generate the certificate and return it. The certificate may contain other information, such as dates during which the certificate is valid and a serial number. One part of the value provided by a certificate authority is to serve as a neutral and trusted introduction service, based in part on their verification requirements, which are openly published in their Certification Service Practices (CSP).

The X.509 standard is one of many standards that defines what information can go into a certificate and describes the data format of that information.

The "version" field indicates the X.509 version of the certificate format (1, 2, or 3), with provision for future versions of the standard. This identifies which version of the X.509 standard applies to this certificate, which affects what information can be specified in it. Thus far, three versions are defined. Version 1 of the X.509 standard for public key certificates was ratified in 1988. The version 2 standard, ratified in 1993, contained only minor enhancements to the version 1 standard. Version 3, defined in 1996, allows for flexible extensions to certificates in which certificates can be "extended" in a standardized and generic fashion to include additional information. In addition to the traditional fields in public key certificates (i.e. those defined in versions 1 and 2 of X.509), version 3 comprises extensions referred to as "standard extensions". The term "standard extensions" refers to the fact that the version 3 X.509 standard defines some broadly applicable extensions to the version 2 certificate. However, certificates are not constrained to only the standard extensions and anyone can register an extension with the appropriate authorities (e.g., ISO). The extension mechanism itself is completely generic.

The "serial number" field specifies the unique, numerical identifier of the certificate in the domain of all public key certificates issued by a particular certificate authority (CA) in order to distinguish one certificate from another. When a certificate is revoked, it is actually the certificate serial number that is posted in a certificate revocation list signed by the certificate authority since posting the entire certificate would be wasteful and completely unnecessary. It is for this reason that the serial number for each certificate in the domain must be unique.

The "signature algorithm" field identifies the algorithm used by the certificate authority to sign the certificate. The algorithm identifier, which is a number registered with an internationally-recognized standards organization (e.g., ISO), specifies both the public-key algorithm and the hashing algorithm used by the certificate authority to sign certificates.

The "issuer name" field specifies the X.500 Distinguished Name (DN) of the certificate authority that issued the certificate. For example, the Distinguished Name "c=US, o=ACME Corporation" might be used as the Distinguished Name for the certificate authority issuing certificates to the employees of the ACME Corporation in the United States. In some cases, such as root or top-level certificate authority certificates, the issuer signs its own certificates.

The "validity period" field specifies the dates and times for the start date and the expiration date of the certificate. Every time a certificate is used, the software should examine the certificate to ensure it is still within its validity period. Each certificate is valid only for a limited amount of time, but this period can be as short as a few seconds or almost as long as a century. The validity period depends on a number of factors, such as the strength of the private key used to sign the certificate or the amount one is willing to pay for a certificate.

The "subject name" field specifies the X.500 Distinguished Name of the entity holding the private key corresponding to the public key identified in the certificate; for example, the Distinguished Name "c=US, o=ACME Corporation, cn=John M. Smith" might be the Distinguished Name for employee John M. Smith of the ACME corporation, where "cn" stands for "common name", "o" is "organization", and "c" is "country".

The "public key" field is the public key of the entity being named or identified by the certificate.

The "subject public key information" field identifies two important pieces of information: a) the value of the public key owned by the subject, and b) the algorithm identifier specifying the algorithm with which the public key is to be used. The algorithm identifier specifies both the public-key algorithm and the hashing algorithm.

The "issuer unique identifier" field was added to the X.509 certificate definition as part of the version 2 standard. The field, which is optional, provides a location to specify a bit string to uniquely identify the issuer X.500 name, in the event that the same X.500 name has been assigned to more than one certificate authority over time.

The "subject unique identifier" field was added to the X.509 certificate definition as part of the version 2 standard. The field, which is optional, provides a location to specify a bit string to uniquely identify the subject X.500 name, in the event that the same X.500 name has been assigned to more than one subject over time (e.g., one John M. Smith leaves ACME Corporation and a second John M. Smith joins ACME Corporation two months later). This field is not used by most, certificate authorities for various reasons primarily because there are more convenient ways to uniquely identify a subject. Specifically, most certificate authorities use the serial Number attribute. Such a scheme fits well within an organization's administrative and directory management procedures because employees require a unique identifier in their X.500 common names anyway (e.g., to handle the case where there are two John M. Smith's in the organization at the same time).

X.509 Version 1 has been-available since 1988, is widely deployed, and is the most generic.

X.509 Version 2 introduced the concept of subject and issuer unique identifiers to handle the possibility of reuse of subject and/or issuer names over time. Most certificate profile documents strongly recommend that names not be reused, and that certificates should not make use of unique identifiers. Version 2 certificates are not widely used.

X.509 Version 3 is the most recent (1996) and supports the notion of extensions, whereby anyone can define an extension and include it in the certificate. Some common extensions in use today are: KeyUsage, which limits the use of the keys for particular purposes such as "signing-only"; and AltNames, which allows other identities to also be associated with this public key, e.g., DNS names, e-mail addresses, IP addresses. Extensions can be marked critical to indicate that the extension should be checked and enforced/used. So, for example, if a certificate has the KeyUsage extension marked critical and set to "keyCertSign" then if this certificate is presented during SSL Communication, it should be rejected, as the certificate extension indicates that the associated private key should only be used for signing certificates and not for SSL.

All the data in a certificate is encoded using two related standards called ASN.1/DER. Abstract Syntax Notation 1 describes data. The Definite Encoding Rules describe a single way to store and transfer that data.

The keys used to interact with various parties need to be hung in a "key chain." In the physical world, a key ring holds keys, and a wallet hold multiple identification and credit cards. In the digital world, a directory service provides storage for digital keys and certificates. The X.500 and LDAP (Lightweight Directory Access Protocol) standards are two main contenders for directory services. Each entry in the directory service is globally and uniquely identified by a Distinguished Name. For example, John M. Smith, who belongs in the Executive Office department at Acme Corporation, might have the following Distinguished Name: "cn=John M. Smith, ou=Executive Office, o=ACME Corporation, c=US", where "cn" stands for "common name", "ou" is "organizational unit", "o" is "organization", and "c" is "country".

Second-generation directory services store entries in proprietary file formats, hash, B-tree, or Relational Database Management System. Although RDBMS is not necessarily optimized for X.500 Distinguished Names, the maturity, scalability and additional utilities in RDBMS make it an attractive alternative as a directory service repository. X.509v3 certificates and public keys can also be stored and protected in an X.500- or LDAP-based directory service. If a user's secret key is compromised, the certificate associated with the public key must be revoked and added to the appropriate certificate authority's Certificate Revocation List (CRL). There is a delicate balance between the frequency of CRL update—especially if there are several CRL replicas—and minimizing the amount of damage caused by the compromised key. Real-time CRL updates shrink the window of vulnerability, but in a mass market they require more overhead than a batched nightly update approach.

With reference now to FIGS. 15A–15G, simplified block diagrams-depict a prior art method of authenticating a customer to a financial institution through the use of certificates. FIG. 15A shows that the prior art method required three parties to be involved in a financial transaction. Customer 1501 may be a consumer of financial services supplied by financial institution 1502, which may be a traditional financial institution or a credit card company that supplies various financial services through well known transactions, such as checking account transactions, credit card transactions, etc.

Before performing a financial transaction with financial institution 1502, customer 1501 has been instructed to obtain a digital certificate. Financial institution 1502 may accept digital certificates issued by a variety of authorized, trusted third parties. One of these third parties may be represented by trusted third party 1503. FIG. 15B shows that customer 1501 transmits an appropriate message to trusted third party 1503 requesting the issuance of a digital certificate. Trusted third party 1503 has access to a database comprising information on many individuals. Customer 1501 must provide enough identifying information to trusted third party 1503 so that trusted third party 1503 may authenticate the identity of customer 1501.

FIG. 15C shows that trusted third party 1503 issues a certificate to customer 1501 upon authentication of the identity of customer 1501.

FIG. 15D shows customer 1501 presenting the previously issued certificate to financial institution 1502 while requesting financial services from financial institution 1502 in an electronic manner.

FIG. 15E shows that financial institution 1502 must authenticate the presented certificate by transmitting an authentication request to trusted third party 1503. In so doing, financial institution 1502 may also be required to supply a previously issued certificate to trusted third party 1503 so that trusted third party 1503 may authenticate the origination of the authentication request. In other words, trusted third party 1503 may also authenticate the identity of the party representing itself as financial institution 1502.

FIG. 15F shows trusted third party 1503 responding to the authentication request by transmitting the appropriate failure or success message to financial institution 1502 that does or does not authenticate the identity of customer 1501.

FIG. 15G shows a situation in which financial institution 1502 has authenticated the identity of customer 1501 and has proceeded to perform financial transactions with customer 1501.

At each transmission step shown in FIGS. 15A–15G, the communication may be performed according to appropriate secure communication protocols. In one respect, trusted third party 1503 acts as a registration authority for customer 1501 by issuing certificates to authenticated persons. In another capacity, trusted third party 1503 acts as a certification authority for financial institution 1502 by validating presented certificates. Financial institution 1502 is the central figure in this method of authenticating the identity of customer 1501. Financial institution 1502 guides customer 1501 in its selection of an authorized trusted third party. Financial institution 1502 is also attempting to provide financial services to customer 1501. In directing customer 1501 to interact with trusted third party 1503, financial institution 1502 complicates the provision of services to customer 1501. Customer 1501 may find it difficult or confusing to interact with a third party outside of financial institution 1502, and the customer may be physically and technologically inconvenienced in so doing.

In addition to the inconvenience to the customer of interacting with the third party, the maintenance of valid certificates may also create many difficulties. As described above, each certificate has a unique identifier called a Distinguished Name. Certificates are managed, e.g., issued and revoked, by a certificate authority, and certificate management can represent significant costs to the application.

Certificates are revoked when security has been compromised, such as a loss, theft, modification, unauthorized disclosure, or a compromise of the private key of the certificate. Certificates are permanently invalidated and can not be 'unrevoked', resumed, reinstated, or reactivated later. A user whose certificate has been revoked must request that a new certificate be issued with additional costs to the application and/or user.

At other times, however, the application may need to temporarily disable a user's access to his account data, or a user may wish to prevent access to his account data for some period of time. A problem exists with current certificate schemes as there is no way to temporarily revoke access to a user's account data. Since there is no suspend/resume actions associated with certificates, the current solution for suspending a certificate is to revoke it. This renders the certificate permanently invalid, and in order to resume use of the certificate, a new certificate must be issued using time and resources.

SUMMARY OF THE INVENTION

The present invention provides a method and system for certificating and authenticating an identity of a customer of a financial institution using digital certificates. The customer and the financial institution communicate via a communications medium. The financial institution receives a digital registration request from the customer and verifies the identity of the customer by reconciling identification data in the digital registration request with identification data in a customer data structure at the financial institution. Responsive to verifying the identity of the customer, the financial institution generates a digital certificate and sends the digital certificate to the customer. When the customer desires access to an on-line application at the financial institution, the customer sends the previously issued digital certificate to the financial institution via the communications link. The financial institution authenticates the digital certificate and grants on-line application access based upon the authenticated digital certificate. The digital certificate may be suspended without being revoked by associatively storing certificate-state information with the distinguished name of the certificate owner, thereby providing a mechanism for suspending and resuming access privileges of the customer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 13 is a flowchart depicting a process in which a suspended certificate is used to temporarily prevent certificate-based user authentication;

FIG. 14 is a flowchart depicting the method of the present invention for reinstating a previously suspended certificate.

DETAILED DESCRIPTION OF THE PREFERRED EMBODIMENT

Figure 1:
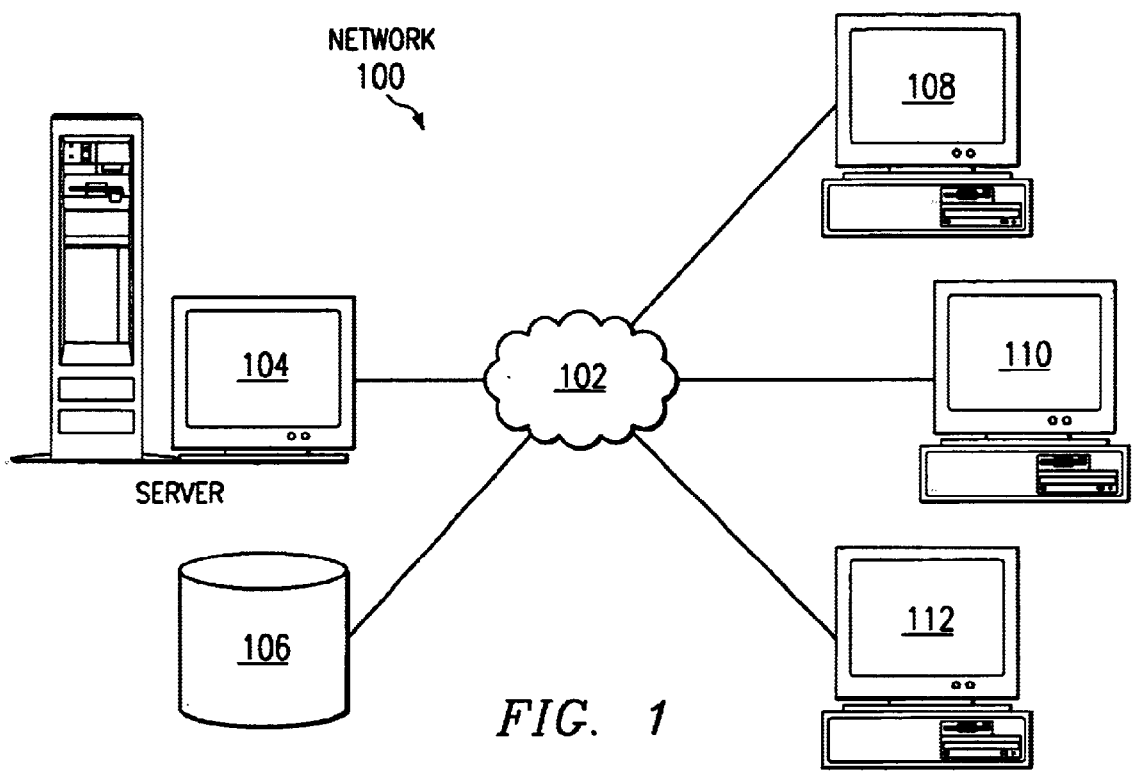
FIG. 1 is depicting a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
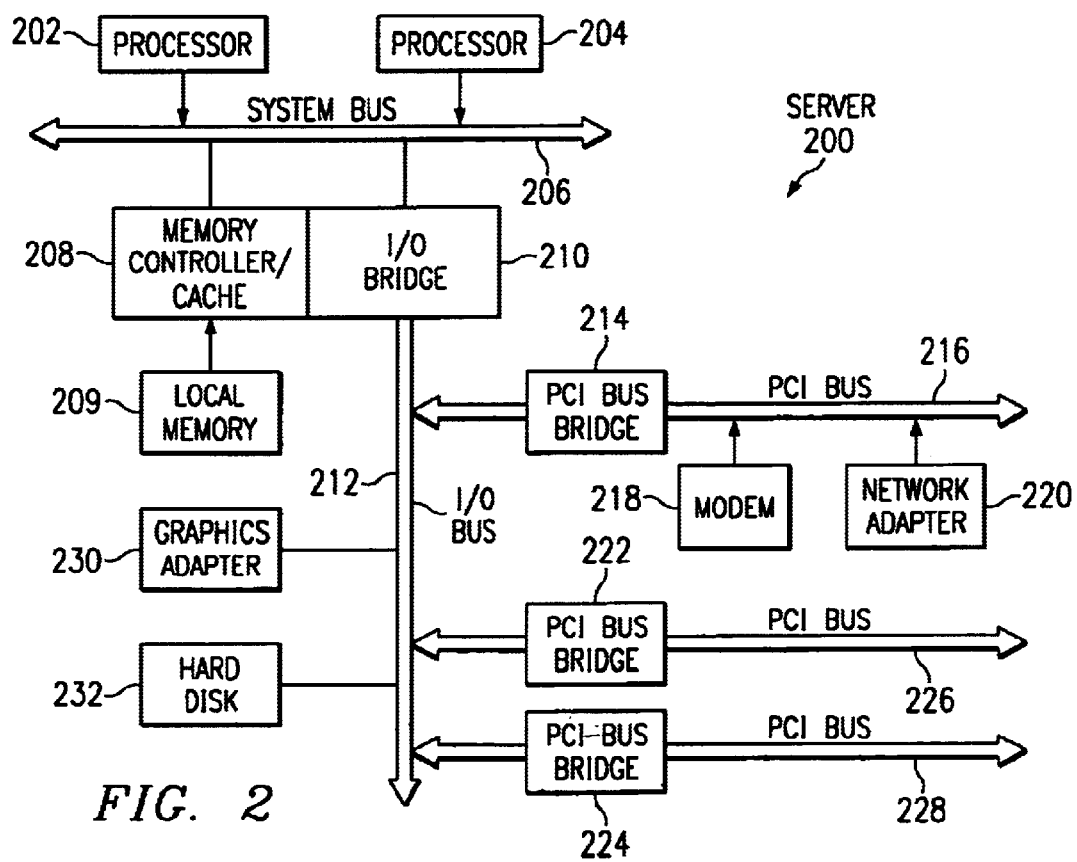
FIG. 2 is a block diagram depicting a data processing system, which may be implemented as a server.

Referring to FIG. 2, a block diagram depicts a data processing system, which may be implemented as a server, such as server 104 in FIG. 1, in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
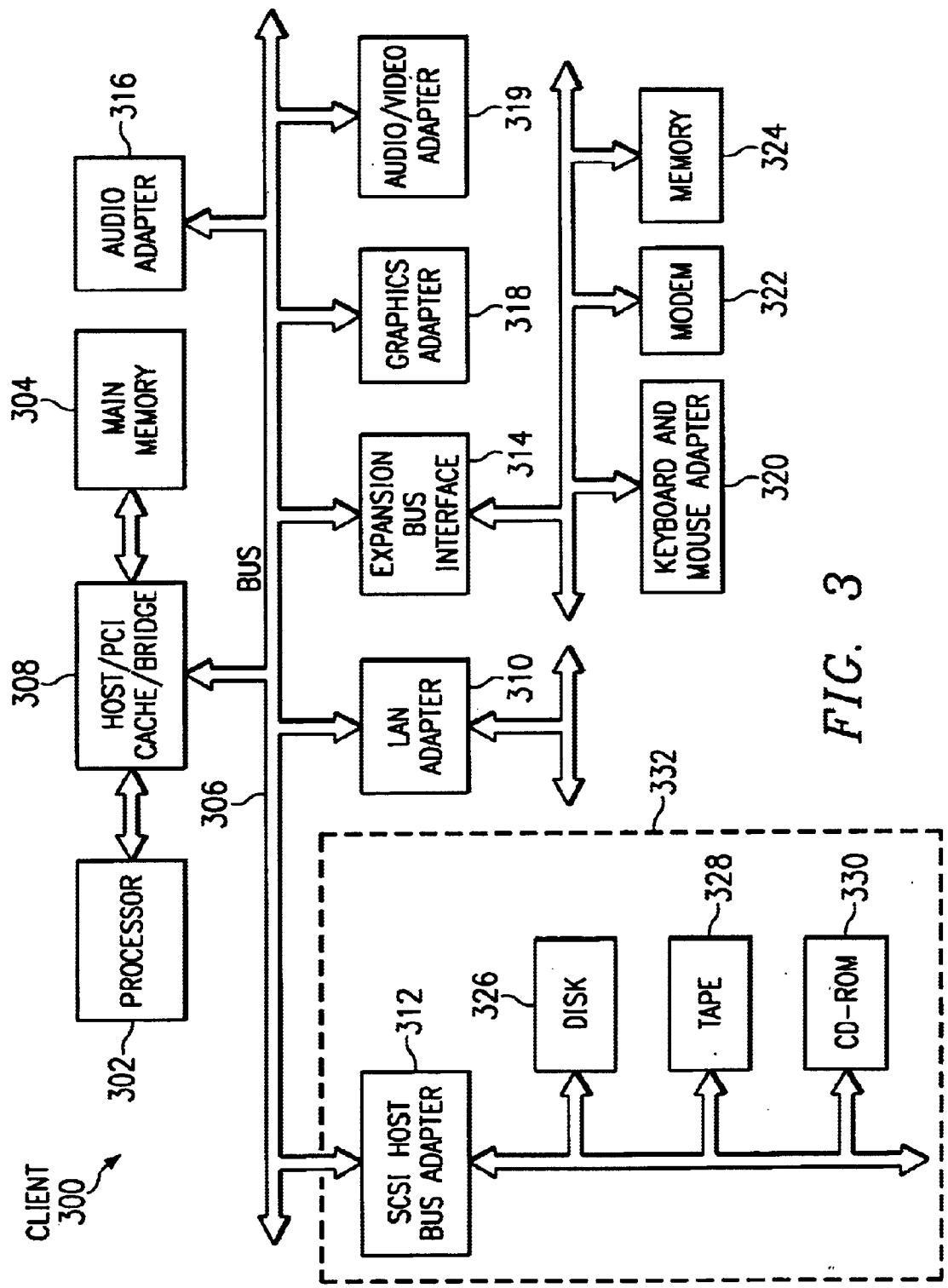
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and smart card adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330.

Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations with respect to the present invention. Although FIGS. 1–3 provide examples of configurations of computer systems on which the present invention may execute, the following background information may provide a context for understanding the overall computing environment in which the present invention may be used.

Figure 4:
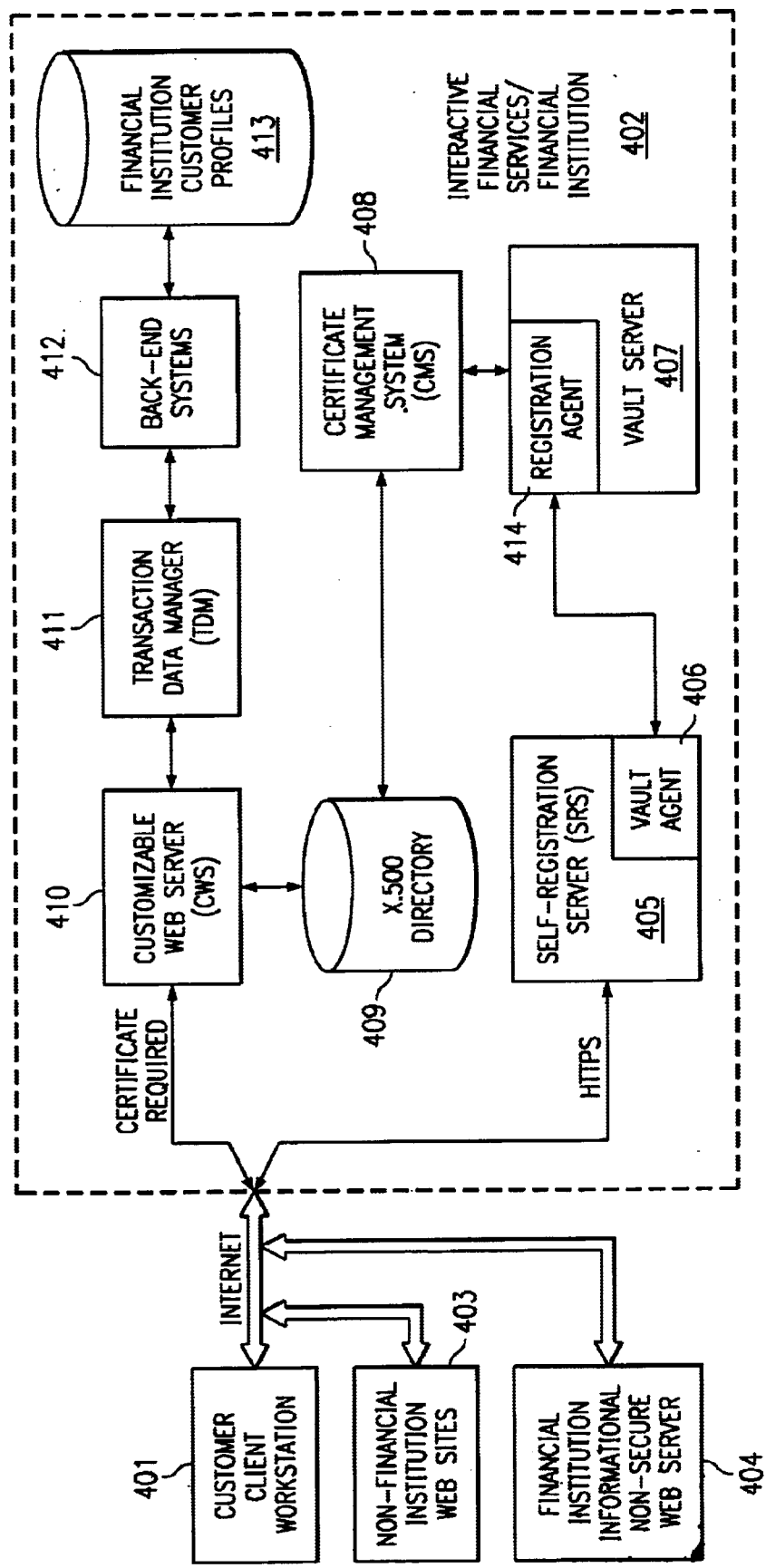
FIG. 4 is a block diagram depicting an overall view of the components that may be used in supplying interactive financial services according to the present invention.

With reference now to FIG. 4, a block diagram depicts an overall view of the components that may be used in supplying interactive financial services according to the present invention. FIG. 1 provides a description of a general distributed data processing system that may be compared and contrasted with the distributed data processing system shown in FIG. 4. Customer client workstation 401 may be similar to any of clients 108, 110, and 112 shown in FIG. 1. The non-financial institution Web sites 403 may be located on a server similar to server 104 in FIG. 1. Servers 404, 405, and 410 may be similar to server 104. Customer client workstation 401 may be connected to servers 404, 405, and 410 across an intranet in a manner similar to the connection shown in FIG. 1. Transaction data manager 411, vault server 407, financial institution informational non-secure Web server 404, self-registration server 405, and customizable Web server 410 may communicate with one another across an intranet in a manner similar to that described in FIG. 1. Other workstations not shown in FIG. 4 may be connected to the same intranet to provide computing resources to employees of the financial institution. Each of those workstations and the customer client workstation 401 may be configured similarly to the data processing system 300 shown in FIG. 3.

A customer of a financial institution is represented by customer client workstation 401. Customer client workstation 401 may have Internet browser software or other communication software. Customer 401 of the financial institution that may attempt to use customer client workstation 401 to gain access to financial services from a financial institution is similar to the person described as customer 1502 in FIGS. 15A–15G. Customer 401 using the client workstation and client workstation hardware 401 may be used interchangeably in the following detailed descriptions of the figures.

The financial institution from which customer 401 desires to obtain financial services is depicted by interactive financial services 402. Interactive financial services 402 is similar to financial institution 1502 shown in FIGS. 15A–15G. Interactive financial services 402 is the conglomeration of various computer systems viewed as a whole. The financial institution as an entity and the computer systems of interactive financial services 402 may be used interchangeably in the following detailed descriptions of the figures.

Customer 401 may navigate the World Wide Web across the Internet with a browser to various Web sites stored on servers, such as non-financial institution Web site 403. Customer 401 may desire to interact with financial institution 402, and by pointing a Web browser to the appropriate URL's, customer 401 may view Web pages provided by financial institution 402. Customer 401 and various persons without accounts at financial institution 402 may view Web pages presented by financial institution 402 on a non-secure Web server 404 using standard HTTP protocols. At some point in time, customer 401 may desire to obtain access to a personal account held at financial institution 402 through appropriate on-line transactions. To do so, customer 401 will interact with self-registration server 405 through his browser by the appropriate HTTPS protocols. Self-registration server 405 may contain vault agent 406 for communicating with vault server 407 by appropriate secure protocols. Vault server 407 may contain registration agent 414 for providing reciprocal communication facilities. Self-registration server 405 requests generation and storage of digital certificates from vault server 407. Vault server 407 may communicate with certificate management system 408 which stores and retrieves digital certificates and other information from X.500 directory 409. Upon issuance of a digital certificate, self-registration server 405 would return the digital certificate to customer 401 so that customer 401 may present the digital certificate at a later time in order for financial institution 402 to authenticate the identity of customer 401.

After customer 401 has obtained a digital certificate, customer 401 may communicate with customizable Web server 410 of interactive financial services 402. Customizable Web Server 410 may comprise an IBM RS/6000 running on AIX operating system, Netscape Enterprise Server software, and other interactive financial services software, all of which may be customized to the needs of financial institution 402. As shown in FIG. 4, a certificate is required by customizable Web server 410 from customer 401 before customizable Web server 410 will perform any financial transactions on behalf of customer 401. Again, the World Wide Web browser on customer client workstation 401 communicates with customizable Web server 410 through secure communication protocol. Once customer 401 logs on to customizable Web server 410, financial institution 402 may perform financial transactions for the appropriate accounts of customer 401.

Customizable Web server 410 may generate transaction requests to transaction data manager 411 across a secure communication system. Transaction data manager 411 is responsible for managing and controlling all electronic transactions of customer 401 with interactive financial services 402. Transaction data manager 411 may communicate with a plurality of back-end systems 412 that comprise legacy hardware and software. Back-end systems 412 may comprise those systems that perform traditional transaction management for financial institution 402, such as recording teller transactions and automatic teller machine (ATM) transactions. These transactions and other customer information may be stored in customer profiles 413.

In this manner, transaction data manager 411 may insure that electronic transactions received by customer 401 through Internet access facilities provided by interactive financial services 402 are coordinated with historical transaction records stored in customer profiles 413. For example, transaction data manager 411 may receive postings from self-registration server 405 regarding the registration of customer 401 for Internet access to financial services from financial institution 402. While the appropriate digital certificates and keys are stored and managed by certificate management system 408, transaction data manager 411 may update the profile for customer 401 by storing appropriate information in customer profiles 413 to record the issuance of certificates to customer 401.

Figure 5:
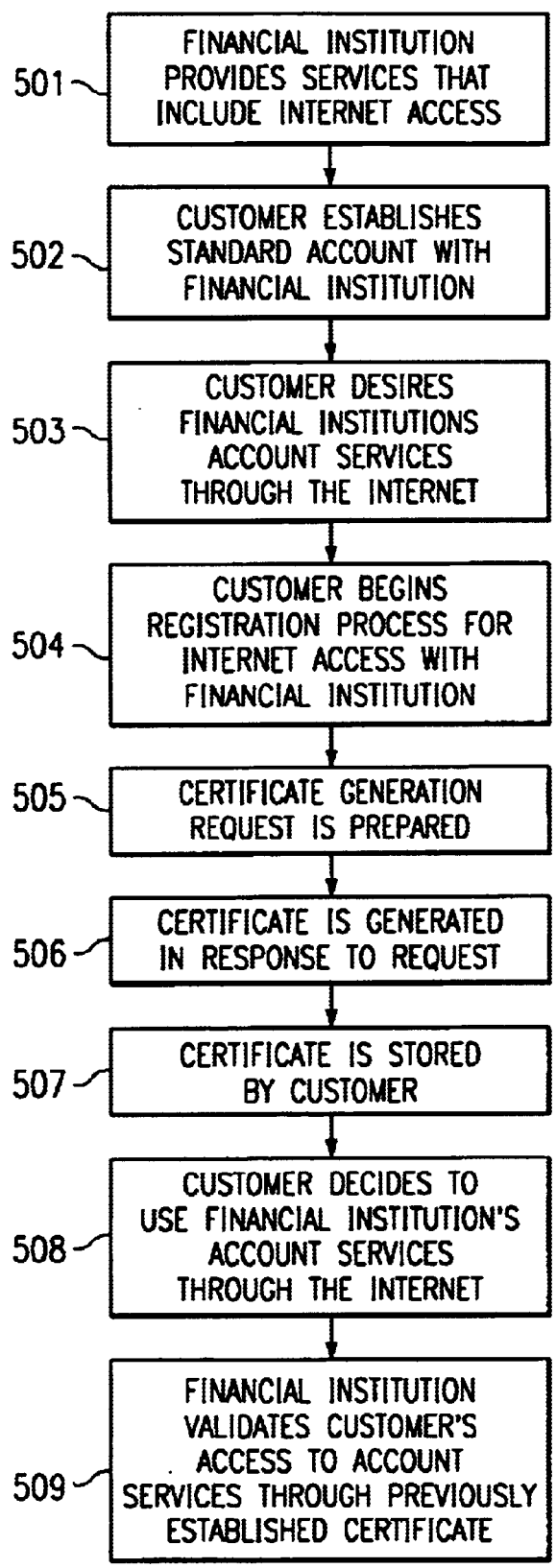
FIG. 5 is a flowchart providing an overall view of the present invention for providing certificate-based user authentication.

With reference now to FIG. 5, a flowchart provides an overall view of the present invention for providing certificate-based user authentication. Financial institutions traditionally provide financial banking functions and services to the public. These services may include a wide variety of financial transactions, such as checking accounts, savings accounts, credit cards, installment loans, lines of credit, certificates of deposit, mortgage loans, etc. Financial institutions provide access to these services in a variety of ways.

In addition to maintaining physical facilities where persons may conduct these transactions with tellers and financial institution officers, many financial institutions provide access to account services through the public telephone system. Many financial institutions are attempting to provide these services to customers through the World Wide Web, or Internet. The present invention is intended as a solution to the problem of authenticating persons who present themselves across the World Wide Web or Internet as legitimate customers owning accounts at a financial institution.

The overview of the method begins when a financial institution decides to provide financial transactions and services through Internet access (step 501). Customers of the financial institution continue to establish standard accounts with the financial institution in the traditional manner (step 502). At some point, however, customer 401 desires on-line access to the financial institution's services, for example, through the Internet (step 503). Customer 401 uses a Web browser to locate the financial institution's Web site on the Internet. The financial institution's site offers a link that, when selected, directs the browser to the registration page. Examples of services that may be provided by the financial institution through the Internet might include the following: balance inquiries; customer profile inquiries; transaction histories, such as posting of checks; electronic funds transfer; electronic mail to or from the financial institution; or other functions that may be performed electronically.

Before obtaining Internet access, however, customers must begin a registration process for Internet access with the financial institution (step 504). The registration requests that customer 401 provide identification. Customer 401 is already a customer of the financial institution, and the financial institution requires a minimum amount of identity information in order to authenticate customer 401 for use of Internet financial banking services. After entering customer 401 information, customer 401 is then guided through the rest of the process to receive a digital certificate.

A certificate generation request is prepared following appropriate communication between customer 401's browser and interactive financial services 402 (step 505). Customer 401's Web browser on customer client workstation 401 is instructed to generate a public/private key pair and to return the public key to self-registration server 405. Customer 401's identity, taken from the financial institution's customer profiles 413, and the public key, are used to build a request to certificate management system 408.

A digital certificate is generated in response to the previous request (step 506). The certificate generation request is forwarded, in a secure manner, to certificate management system 408, which generates a certificate for customer 401 that is signed by the financial institution. Certificate management system 408 records customer 401's name and his logon id in an X.500 directory. The complete X.509 digital certificate is returned to self-registration server 405.

The digital-certificate is then stored by customer 401's browser (step 507). Self-registration server 405 sends the certificate to the browser, which stores it in a certificate database locatable by the browser within customer client computer 401. Customer 401 can now begin Internet financial banking.

At this point, customer 401 is electronically able to conduct financial transactions with financial institution 402 across the Internet. Either immediately after registering for Internet access or at some later point in time, customer 401 will decide to use the Internet access for which he has previously registered (step 508). Customer 401's Web browser is directed to the financial institution's Internet financial banking Web site located on customizable Web server 410. This site requires that customers use the Secure Socket Layer (SSL) protocol between the browser and the Web server. In addition, it requires customer 401 to have previously obtained a valid digital certificate signed by the financial institution. The financial institution will validate customer 401's access to account services through the previously established digital certificate (step 509). If customer 401 has a valid digital certificate, customer 401's Distinguished Name that is contained in the certificate is used to access the directory. The Directory entry contains customer 401's logon id that was put there at the time the certificate was created. The logon id is retrieved and used to build the logon Web page that is sent to customer client computer 401 to begin banking.

Figure 6:
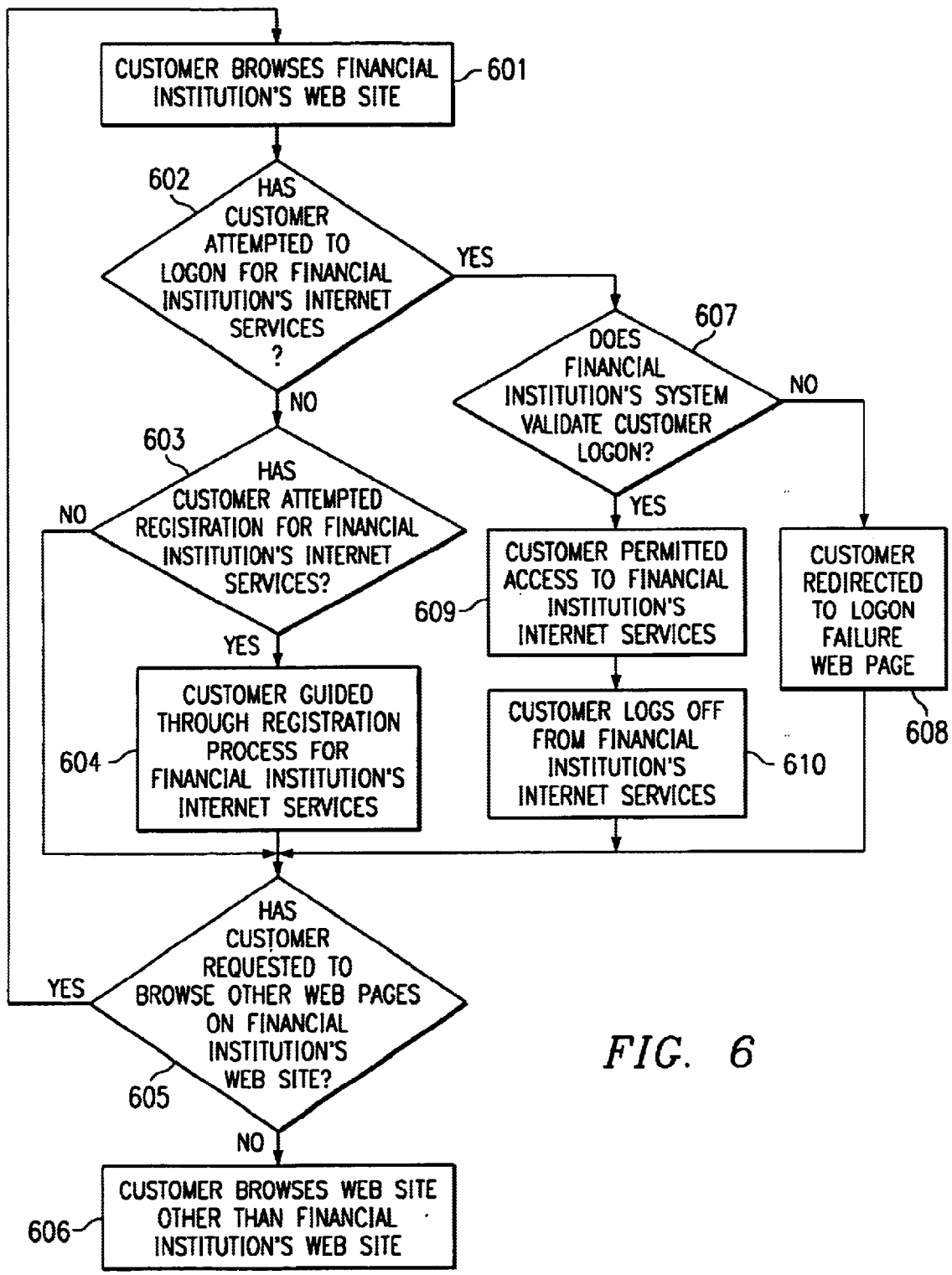
FIG. 6 is a flowchart depicting an overall view of a customer's interaction with the financial institution's interactive financial service Web site.

With reference now to FIG. 6, a flowchart depicts an overall view of a customer's interaction with the financial institution's interactive financial service Web site. Although similar to FIG. 5, FIG. 6 shows some of the decisions that customer 401 will make while navigating the financial institution's Web site.

At some point in time, customer 401 browses the financial institution's Web site (step 601). A determination is made as to whether customer 401 has attempted to log on for Internet access to the financial institution's services (step 602). If customer 401 has not attempted to log on for the financial institution's Internet services, a determination is then made as to whether customer 401 has attempted to register for the financial institution's Internet service (step 603). If customer 401 has not attempted to register, then a determination is made as to whether a customer has requested to browse other Web pages on the financial institution's Web site (step 605). If so, then the process returns to step 601 to allow customer 401 to browse the financial institution's Web site. If not, then customer 401 has decided to browse elsewhere, and the process completes when customer 401 browses other Web sites outside the financial institution's Web site (step 606).

However, if a determination is made that a customer has attempted to register for the financial institution's Internet access to financial services, customer 401 is then guided through the registration process in order to obtain digital credentials that will permit access through the Internet to the financial institution's financial services (step 604). The registration process is described in more detail with reference to FIGS. 7 and 8.

If a determination is made that a customer is attempting to logon for Internet access provided by the financial institution to its financial services, as determined by step 602, then the financial institution attempts to authenticate customer 401's identity for logon (step 607). If customer 401 cannot be validated for logon access, customer 401 is redirected to a Web page that describes the logon failure (step 608). This page may include information on registration for customers who have previously established traditional accounts with the financial institution. The Web page may also include information on establishing a traditional account at the financial institution if customer. 401 has not previously done so. Customer 401 may also be invited to browse information elsewhere on the financial institution's Web site.

If the financial institution's system validates customer 401 for logon, then customer 401 is permitted access to the financial institution's services through the Internet (step 609). After customer 401 has performed financial transactions through the Internet with the financial institution's Web site, customer 401 would logoff (step 610). If customer 401 fails to logoff, the financial institution would terminate customer 401's Internet access after a predetermined time period so that other persons cannot access customer 401's account information.

Figure 7:
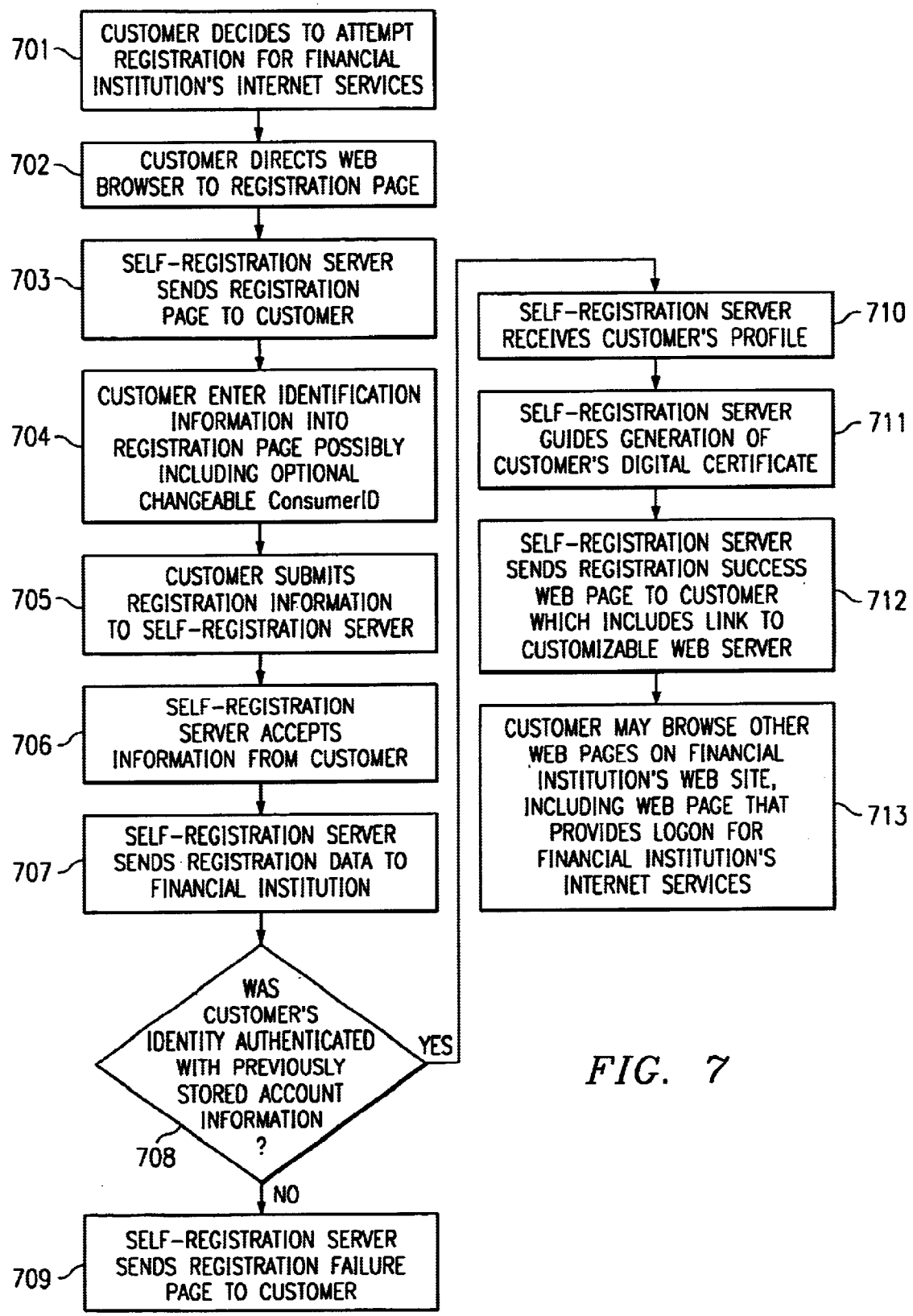
FIG. 7 is a flowchart depicting the process of registering a customer with the financial institution for Internet access to financial services provided by the financial institution.

With reference now to FIG. 7, a flowchart depicts the process of registering a customer with the financial institution for Internet access to financial services provided by the financial institution. The process steps shown in FIG. 7 depict further details of the registration process mentioned in step 604 of FIG. 6. As previously noted, a customer decides to attempt registration for Internet access to the financial institution's services (step 701). Customer 401 may begin the registration process by directing a Web browser to the financial institution's registration page (step 702). In accordance with standards established for communication on the Internet for World Wide Web access, such as the HTTP communication protocol, a self-registration server 405 within the financial institution's computer system sends a registration page to customer 401's browser on customer client computer 401 (step 703). Customer 401 enters identification information into the registration page (step 704). This information includes those items known to customer 401 and to the financial institution through customer profile 413 previously stored within the financial institution's customer database. At this point, customer 401 also provides a Changeable Consumer id that will be used at a later time by customer 401 to identify himself electronically to the financial institution. Customer 401 then submits the registration information to financial institution 402 (step 705). Self-registration server 405 accepts the information (step 706), and using the information supplied by customer 401, self-registration server 405 sends the registration data to the financial institution (step 707).

A determination is then made as to whether the identity information from customer 401 who is attempting to register can be authenticated with the identity of a customer in previously stored customer account profiles 413 (step 708). If not, then the registration server sends a registration failure page to customer 401's browser (step 709). The registration failure page will provide information to customer 401 describing the manner in which the financial institution cannot authenticate customer 401's identity. Customer 401 may be provided other information for completing the registration process or may be provided links to other Web pages within the financial institution's Web site that may guide customer 401 to resolving the registration problem.

If the registration server can authenticate customer 401 who is attempting to register, then self-registration server 405 receives the customer's profile (step 710) and guides the generation of a digital certificate (step 711). Once this is completed, self-registration server 405 sends a Web page describing the successful registration process to customer 401 (step 712). This Web page may include a link to the financial institution's customizable Web server 410 that provides the financial services through the Internet. Customer 401 may then browse other Web pages on the financial institution's Web site or may visit the Web page that provides logon access to the financial institution's Internet service (step 713).

Figure 8:
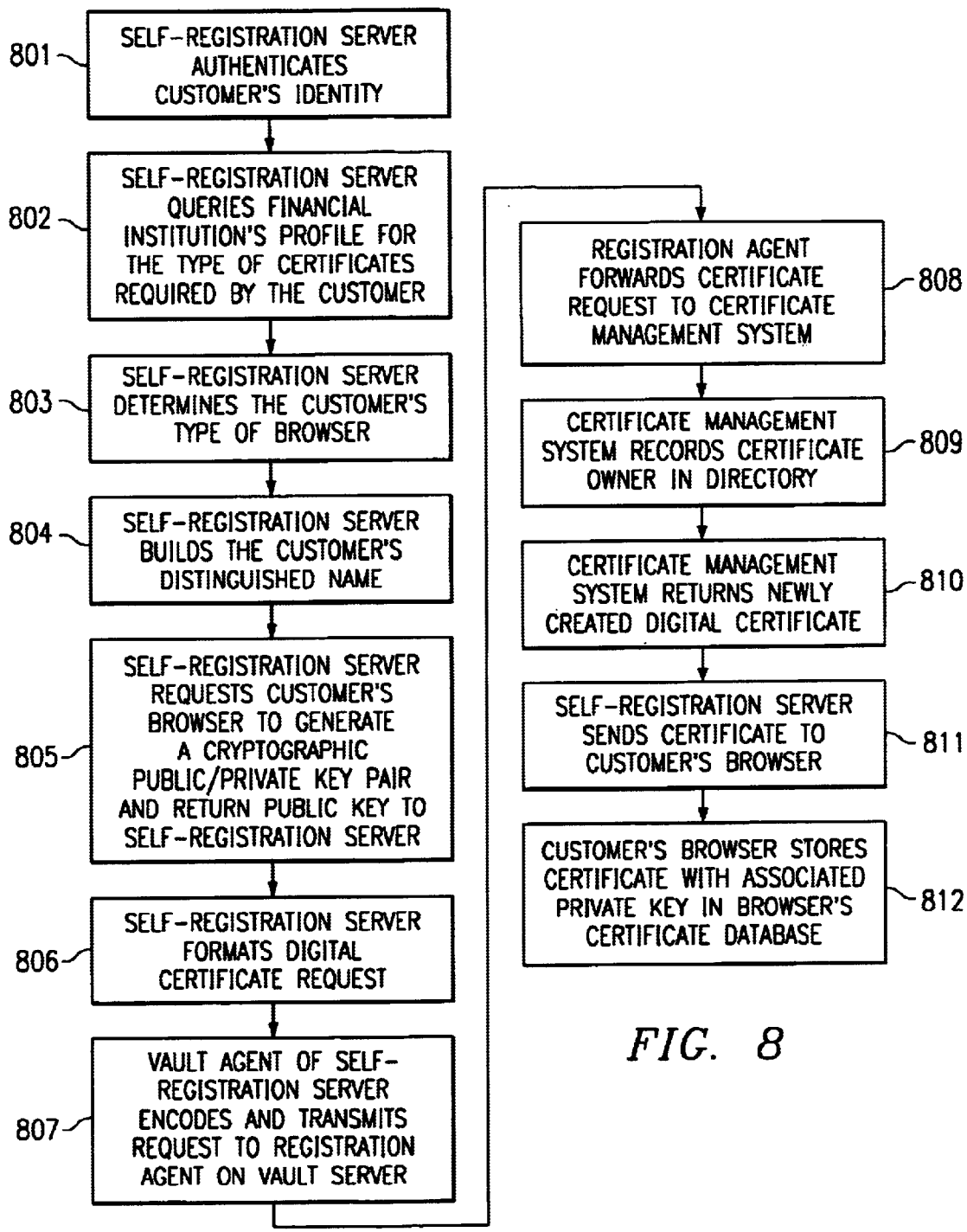
FIG. 8 is a flowchart depicting further details for the generation and storage of a digital certificate for a customer.

With reference now to FIG. 8, a flowchart depicts further details for the generation and storage of a digital certificate for a customer. The process steps shown in FIG. 8 depict further details of the certificate generation process mentioned in step 711 of FIG. 7. As previously noted, the process begins when the registration server attempts to authenticate customer 401's identity (step 801). Self-registration server 405 queries the financial institution's profile 413 for the type of certificates required by customer 401 (step 802). Self-registration server 405 also determines the customer's type of browser (step 803).

Self-registration server 405 then builds the customer's Distinguished Name (step 804). Each certificate associates a customer with a cryptographic key and the certificate identifies its owner by their Distinguished Name. The Distinguished Name is composed of values for country, organization, organizational unit, and the common name attribute. The values for the first three fields may be defined in the customer's profile stored by the financial institution.

Self-registration server 405 retrieves this profile and extracts values for these fields. The common name attribute is composed of three sub-fields: (1) the person's name in the financial institution's customer profile (e.g., Thomas E. Jefferson), (2) a nickname for the certificate, (3) and a random number.

The random number field is generated by self-registration server 405 and allows multiple people to use the same name in their certificates.

Each certificate would have a different nickname chosen by the customer. The nickname (or personal certificate identification name) allows a customer to acquire certificates for more than one PC or device, such as a laptop, a home computer, an office computer, and possibly multiple smart cards. The nickname also allows the financial institution to provide better service to the customer.

In a situation in which the customer loses the certificate or suspects that it may have been compromised in some manner, e.g., by someone stealing a laptop computer on which the certificate was stored, the customer should contact the financial institution to report the theft of the certificate and to have the financial institution revoke the certificate. The customer could call the financial institution and provide identification information that the financial institution can verify against the customer's profile to ensure that the person attempting to revoke the certificate is the rightful owner of the certificate.

At that point, the financial institution may be able to identify a list of certificates that the customer owns. However, it would be unreasonable to assume that the customer could remember the random number of each certificate in order to identify a lost certificate. Instead, the customer can provide the nickname or personal certificate identification name to the financial institution to identify the lost certificate to have the financial institution revoke the certificate. Self-registration server 405 then sends a request to customer 401's browser instructing it to generate a cryptographic public/private key pair and return the public key to the self-registration server 405 (step 805). This is a standard feature of both Netscape Navigator and Microsoft Internet Explorer. The browser uses its cryptographic subroutines to generate a public/private key pair and securely stores the private key in its database. The browser anticipates that it will be receiving a digital certificate that corresponds to this private key. The public key is sent in the reply to the registration server.

Self-registration server 405 then formats a digital certificate request (step 806). When the registration server receives the customer's public key, it has the necessary information to request the certificate. Some of the information that it may provide includes the Distinguished Name of the signer (i.e. the financial institution), the Distinguished Name of the customer, the customer's public key, and the customer's logon id.

Vault agent 406 of self-registration server 405 then encodes and transmits the certificate request to registration agent 414 of vault server 407 (step 807). To insure the validity and confidentiality of the request, the data is encrypted and digitally signed using certificates that were issued to the financial institution's self-registration server 405.

Registration agent 414 forwards the certificate request to certificate management system 408 (step 808). Certificate management system 408 validates that the request is from an authorized source, i.e. the self-registration server 405, by decrypting the request and testing the signature. Certificate management system 408 contains the private key of the financial institution since the financial institution is the certificate authority that is signing its customer's certificates. Certificate management system 408 also contains information on the duration of a certificate's validity. The input data, the duration, and the signing key is used to build a X.509v3 digital certificate.

Certificate management system 408 then records certificate owner 401 in X.500 directory 409 (step 809). Certificate management system 408 may use an X.500 directory to record each certificate it issues. The directory may be searched by the customer's Distinguished Name. When the directory entry is built, it may store the logon id of customer 401 as an attribute. Each certificate may also have a serial number that allows each certificate to be identified individually.

Certificate management system 408 then returns the newly created digital certificate (step 810). Self-registration server 405 then sends the certificate to customer 401's browser (step 811). Customer 401's browser stores the newly generated certificate with its associated private key in the browser's certificate database (step 812).

Figure 9:
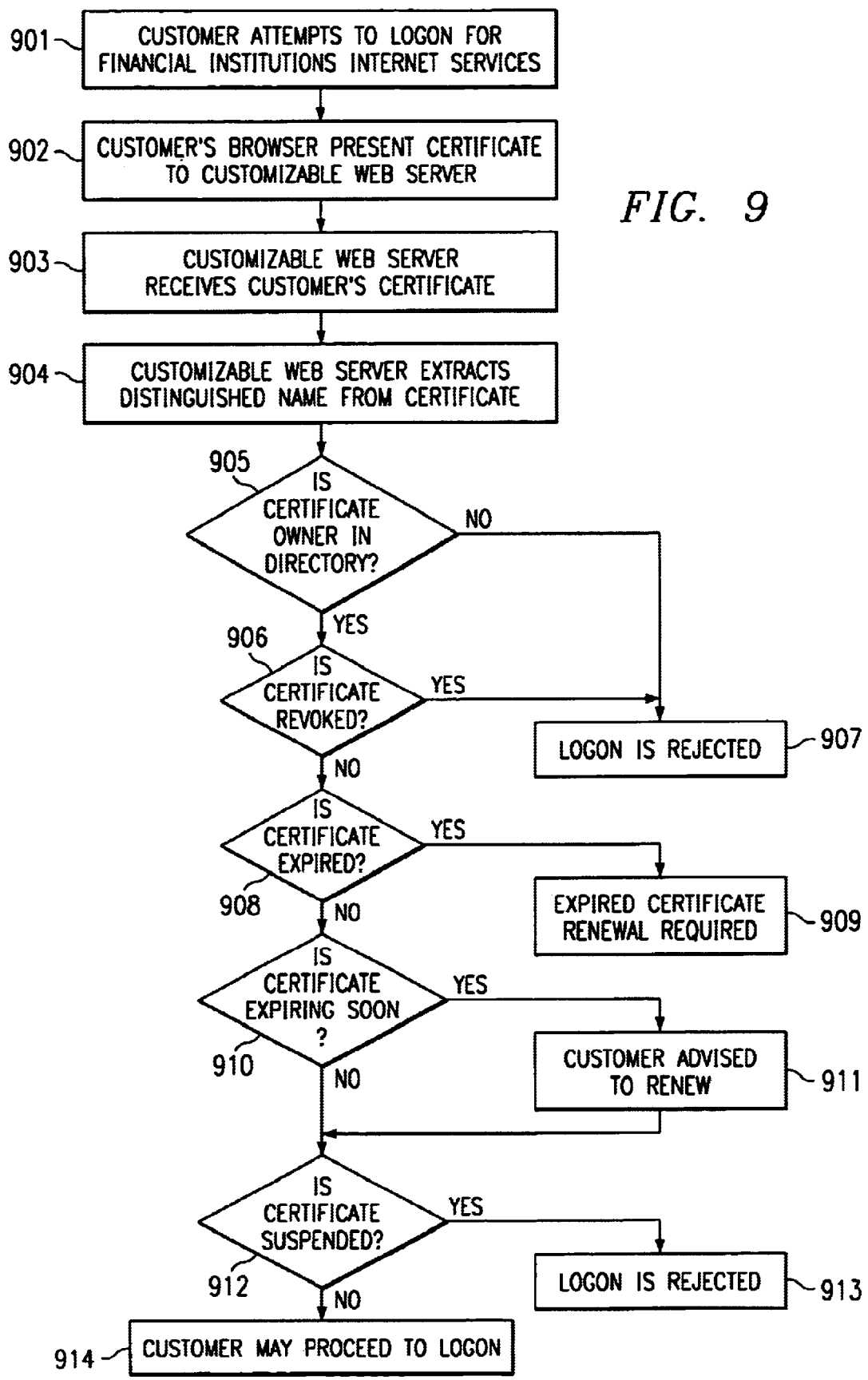
FIG. 9 is a flowchart depicting the process of a customer logging on to use the Internet access provided by the financial institution for its financial services.

With reference now to FIG. 9, the flowchart depicts the process of a customer logging on to use the Internet access provided by the financial institution for its financial services. The process begins when customer 401 attempts to logon to the financial institution's Internet services (step 901). This step was previously noted as step 607 shown in FIG. 6.

When customer 401 uses the provided Web page or hyper link to begin Internet financial banking, the Web browser and the financial banking Web server exchange information. This exchange is called a handshake. The Secure Sockets Layer (SSL) protocol is used in this handshake. This protocol generates encryption keys that are used to secure the session between the browser and the Web server. The method of the present invention uses an administrative option of the Web server software to use customer 401's client certificate in the protocol. Customer 401's browser must provide a certificate signed by a certificate authority recognized by the Web server in order to connect to the server and see the first financial banking page. One alternative is that the only recognized certificate authority is the financial institution itself, i.e. the financial institution acts as its own certificate authority.

The customer's browser must present a digital certificate to the financial institution's customizable Web server 410 (step 902). This digital certificate should be the certificate previously generated according to the process described in FIGS. 7 and 8. Customizable Web server 410 receives customer 401's certificate (step 903) and extracts customer 401's Distinguished Name from the certificate (step 904). The Distinguished Name is used to search the directory. A determination is then made as to whether the certificate owner is in the directory (step 905). If the name is not found, the logon is rejected (step 907).

If the name is found in the directory, a determination is then made as to whether the customer's certificate has been revoked (step 906). The certificate contains a pointer to a directory entry that will contain serial numbers of revoked certificates. Certificate management system 408 accesses the directory with the pointer and checks whether the certificate's serial number is present in the entry. The certificate revocation list is updated on a regular and frequent time schedule to ensure that certificates cannot be used fraudulently.

If the customer's certificate has been revoked, then the logon is rejected (step 907). Information is returned to the browser advising customer 401 that he can not logon and providing information for financial institution's customer service.

If it is determined that customer 401's certificate has not been revoked, then a determination is made as to whether customer 401's certificate has expired (step 908). Each digital certificate contains the date it was issued and the date it will expire. The expiration date is checked against today's date.

If the certificate has expired, then a renewal is required (step 909). If a renewal is required, customer 401 is shown a hyperlink that directs him to the financial institution's registration server to a point at which a renewed certificate may be issued.

If the certificate has not expired, then a determination is made as to whether the certificate is expiring soon (step 910). The certificate's expiration date is also checked to see if it falls within the range specified by the financial institution, for example, 30 days. If the expiration date minus this range is before today's date, customer 401 is advised to obtain a renewed certificate as soon as possible (step 911). Information about renewing the certificate may be provided to customer 401 within the success page that will be sent to customer 401 after the logon process has successfully completed.

If the certificate has not expired or is not expiring soon, then the process continues with a determination as to whether the certificate has been suspended (step 912). The customer's certificate can be suspended by the financial institution's customer service personnel or at the request of the customer. A suspended certificate cannot be used to logon. The directory attribute that contains the customer's logon id may contain a field that indicates it is suspended.

If it is determined that the certificate has been suspended, then the logon on is rejected (step 913). The customer is shown an error message indicating that the certificate is suspended and is given a hyperlink or other information of the financial institution's customer service. Otherwise, the logon process has been successful (step 914).

The directory entry for this consumer was located in step 905. The customer's logon id is used to build the transaction for the financial banking system that allows customer 401 to do financial banking. The financial institution is assured that customer 401 is authentic since he has produced the client certificate that the financial institution issued.

Figure 10:
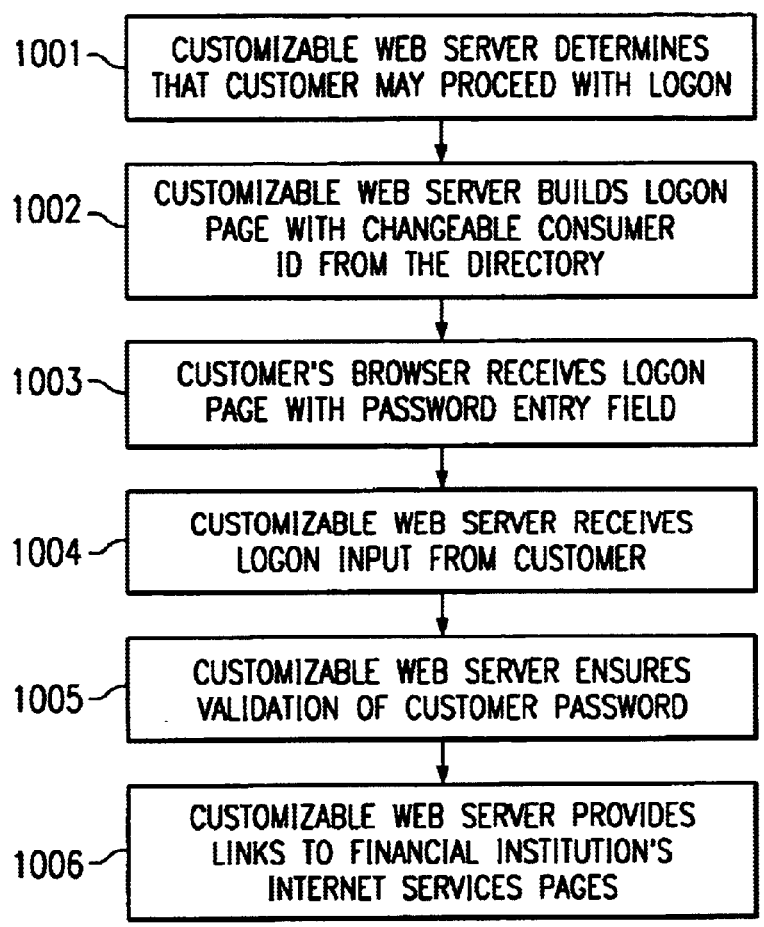
FIG. 10 is a flowchart depicting a process for which a financial institution provides an optional password requirement from a customer in addition to the presentation in authentication of the digital certificate.

With reference now to FIG. 10, a flowchart depicts a process for which a financial institution provides an optional password requirement from customer 401 in addition to the presentation in authentication of the digital certificate. At the financial institution's option, customer 401 can be prompted for a password that is then included in the logon transaction. This helps to prevent someone from fraudulently using the customer's certificate without authorization. The process begins when customizable Web server 410 determines that customer 401 may proceed with the logon process after authenticating the digital certificate (step 1001). This determination may be similar to the steps previously described in FIG. 9. Customizable Web server 410 builds a logon page with the Changeable Consumer id retrieved from the directory (step 1002). If customer 401's certificate is within n days of expiration, the logon page may contain an expiration warning. Customer 401's browser receives the logon page with a password entry field (step 1003). After supplying a password, customer 401 submits the logon Web page, and customizable Web server 410 receives the logon input from customer 401 (step 1004). Customizable Web server 410 ensures that the password of customer 401 is validated (step 1005).

To ensure the validation of customer 401, customizable Web server H10 builds a logon message and sends it to the financial institution, which authenticates the logon ID and password, and if valid, returns the user profile. Customizable Web server 410 provides links to the financial institution's Internet services page or pages if the password is validated (step 1006).

If customer 401 provides an incorrect password, customer 401 receives a predetermined number of attempts to enter a correct password. Back-end systems 412 is responsible for verifying a correct or incorrect password, and transaction data manager 411 counts the number of incorrect password attempts. On a certain number of incorrect password submissions, customizable Web server 410 may suspend or lock customer 401's Internet access until such time as customer 401 contacts the support personnel of the financial institution to determine and correct any problems that customer 401 may have with the financial institution.

Figure 11:
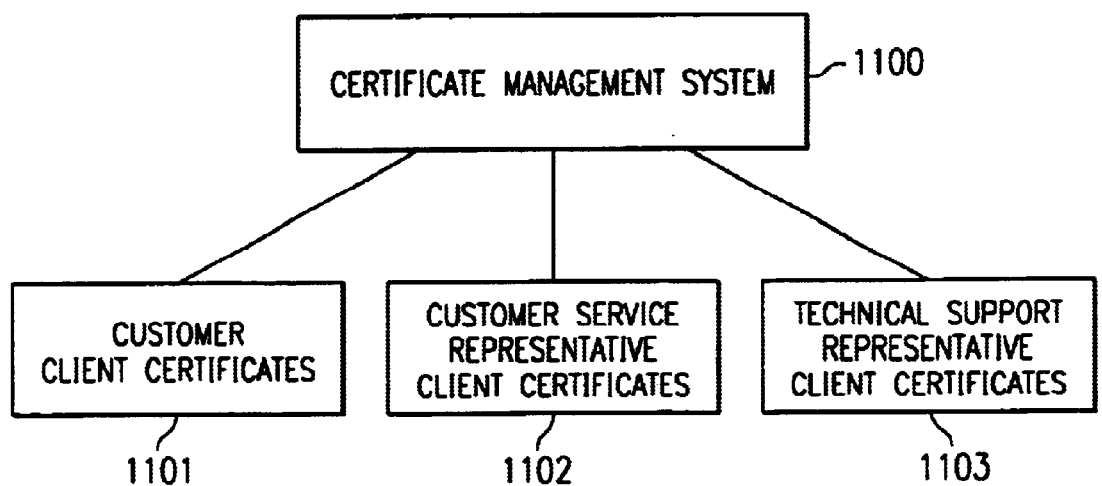
FIG. 11 is a block diagram depicting an alternate embodiment for managing a client certificate.

With reference now to FIG. 11, a block diagram depicts an alternate embodiment for managing a client certificate. In the previous detailed description of the figures, examples were provided of a customer 401 performing financial transactions with financial institution 402, and customer 401 owned accounts managed by financial institution 402. Customer 401 could be said to consume services by financial institution 402. One could, however, broaden the concept of consumer to encompass anyone who utilizes any type of computing resources provided by interactive financial services 402. Other persons such as customer service representatives and technical support representatives also logon and use computing resources within interactive financial services 402. Customer 401 service representatives and the technical support representatives may also be called consumers of resources within interactive financial services 402. By broadening the concept of consumer within financial institution 402, certificate-based user authentication may also be provided for customer service representatives and technical support representatives in a manner similar to the certificate-based user authentication services provided to customer 401.

Interactive financial services 402 may be configured so that certificate-based user authentication is provided for all consumers of computing resources within interactive financial services 402. This may be done by enabling separate certificate namespaces within certificate management system 408.

FIG. 11 shows certificate management system 1100, which is similar to certificate management system 408 in FIG. 4. However, rather than solely managing and storing digital certificates for customers, such as customer 401, certificate management system 1100 may also act as a certificate authority to issue and store certificates for other consumers. The name space stored by a certificate management system 1100 that was previously described with respect to FIG. 4 is shown as customer client certificates 1101. In addition, certificate management system 1100 also issues, generates, and stores digital certificates for customer service representatives and technical support representatives as shown by customer-service-representative-client certificates 1102 and technical-support-representative-client certificates 1103.

By managing multiple certificate namespaces, certificate management system 1100 allows online, interactive, Internet access to those functions required by other consumers of computing resources from interactive financial services 402. In prior art methods of providing computing resources to customer service representatives, interactive financial services 402 would be configured to allow either direct dial-in connections for customer service representative at a remote site or less secure access across the Internet to the remote site through an extranet configuration. With the solution provided by the present invention, a customer service representative may gain Internet access to financial institution 402 in a manner similar to customer 401. Financial institution 402 may be assured that its communications across the Internet are being conducted with a person who has been authenticated as a true customer service representative through the certificate-based user authentication method provided by the present invention.

Figure 12:
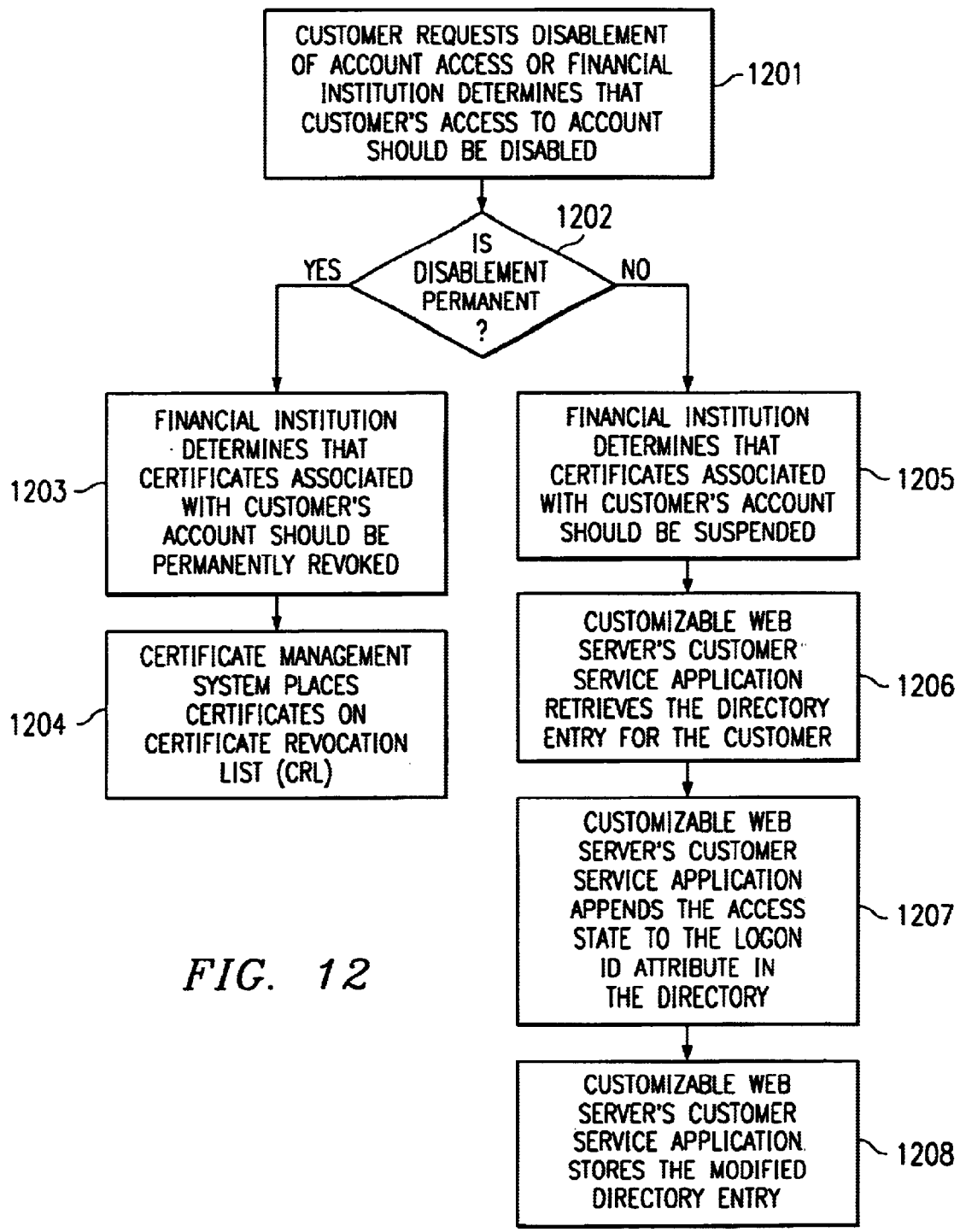
FIG. 12 is a flowchart depicting a method within the present invention for suspending a digital certificate.
Figure 15A:
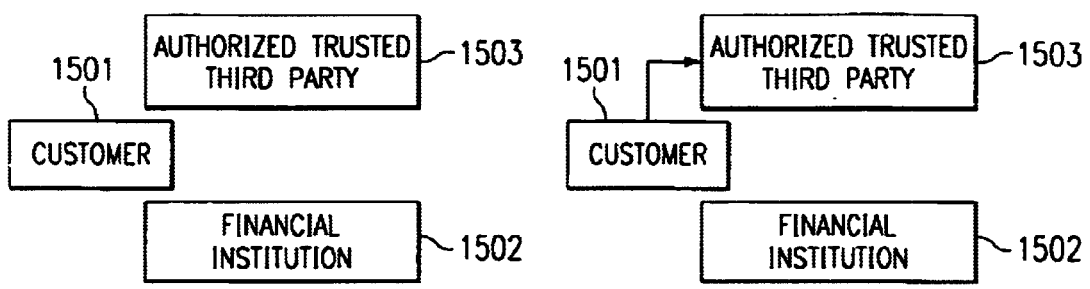
FIGS. 15A–15G are simplified block diagrams depicting a prior art method of authenticating a customer to a financial institution through the use of certificates.
Figure 15B:
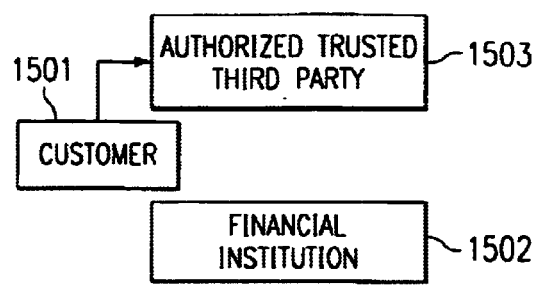
Figure 15C:
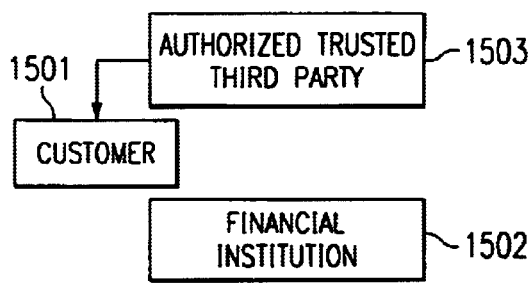
Figure 15D:
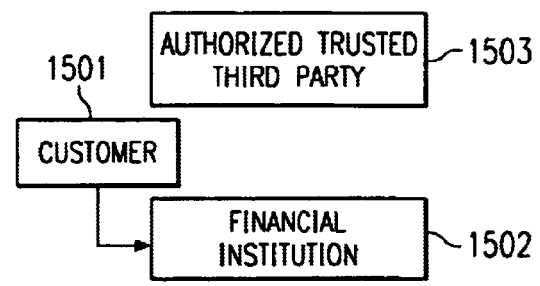
Figure 15E:
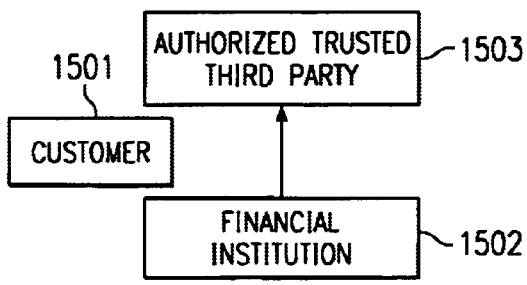
Figure 15F:
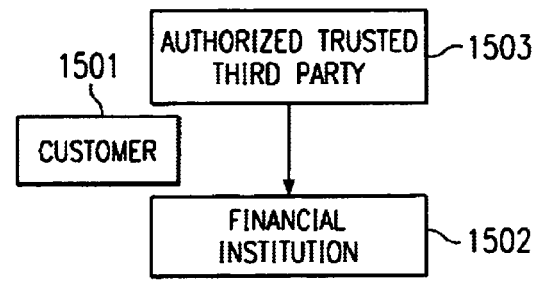
Figure 15G:
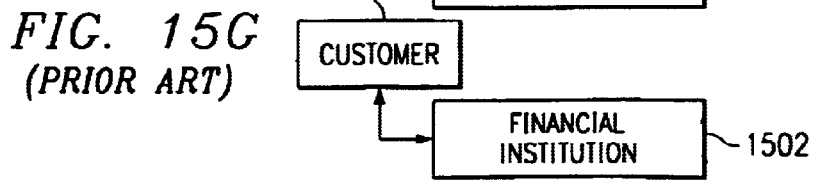

With reference now to FIG. 12, a flowchart depicts a method within the present invention for suspending a digital certificate. At some point in time, a customer has registered and received a certificate that allows Internet access to financial services provided by the financial institution. At some later point during the life of the certificate, it may be necessary to disable the certificate. For example, customer 401 may request disablement of Internet access to his account, or the financial institution may determine that customer 401's access to the account should be disabled (step 1201). A determination is made as to whether the disablement should be permanent (step 1202). This determination may be based upon a variety of reasons. If a customer is closing an account, the digital certificates associated with customer 401's account should be permanently disabled. If customer 401 legally changes his or her name, then customer 401's name within customer 401 profile database must be changed, and the Distinguished Name used by the financial institution to store certificates associated with customer 401's account should also be changed. In order to change the Distinguished Name associated with the certificate, the certificate must be permanently revoked. Customer 401 may also notify the financial institution that a digital certificate has been stolen, copied, or believed to have been compromised. The financial institution would then also permanently revoke the digital certificate.

If financial institution 402 determines that the digital certificates associated with the account of customer 401 should be permanently revoked (step 1203), then certificate management system 408 will place the digital certificates on its certificate revocation list (CRL) (step 1204). As certificate management system 408 acts as the certificate authority for financial institution 402, each certificate that must be authenticated during logon attempts will be checked against the certificate revocation list to ensure that the certificate being presented by customer 401 during a logon session has not been revoked. This step was previously described as step 906 in FIG. 9.

If financial institution 402 determines that the certificates associated with the account of customer 401 should be temporarily disabled (step 1205), then certificate management system 408 acting as the certificate authority for financial institution 402 will suspend the certificates.

According to the method of the present invention, the access state of the account of customer 401 is used to place a temporary block on the use of certificates issued to customer 401 on this account. The customer service application on customizable Web server 408 retrieves the directory entry associated with customer 401's certificates (step 1206) and appends the access state to the logon id attribute in the directory (step 1207). The customer service application on customizable Web server 408 then stores the modified directory entry (step 1208).

With reference now to FIG. 13, a flowchart depicts a process in which a suspended certificate is used to temporarily prevent certificate-based user authentication. When customer 401 attempts to logon with a certificate (step 1301), customer 401's browser presents the certificate to customizable Web server 410 (step 1302). Customizable Web server 410 parses the certificate and extracts its Distinguished Name (step 1303). Customizable Web server 410 then searches the directory using the Distinguished Name (step 1304). Customizable Web server 410 then determines whether the logon id retrieved from the directory has an associated suspended state (step 1305), and for this example, the certificate has an associated suspended state. (step 1306). The suspended state associated with the logon ID of the Distinguished Name reflects the suspended access state of customer 401's account. The suspended state may have been stored by previously appending a string, such as ":SUSPEND", to the logon ID stored in the directory. Customizable Web server 410 then notifies customer 401 of the denied access (step 1307), and customizable Web server 410 may then present Web pages giving customer 401 information on reinstating access to the account, etc.

With reference now to FIG. 14, a flowchart depicts the method of the present invention for reinstating a previously suspended certificate. Financial institution 402 determines that the certificates associated with the account of customer 401 should be reinstated (step 1401).

The certificate may have been previously suspended for a variety of reasons, and the reasons for reinstating the certificate may also vary. For example, customer 401 may have requested the suspension of access to customer 401's account, thereby causing the certificates associated with customer 401's account to be suspended. On notification from customer 401 to the financial institution that customer 401 desires access to be reestablished with the account, the financial institution then reinstates the certificates associated with customer 401's account.

Financial institution 401 must then correct the access state previously stored with customer 401's Distinguished Name in the directory. The customer service application of customizable Web Server 410 retrieves the directory entry associated with customer 401's certificates (step 1402), removes the access state previously appended to the logon id attribute (step 1403), and stores the modified directory entry back in the directory (step 1404).

Although the depicted examples are directed toward electronic certificates transmitted over communication lines, the processes of the present invention may be used in other forms. For example, smart cards are another application for a user certificate-based authentication application system, although the cost of revoking and reissuing certificates is higher in this application.

A user may present a smart card containing a digital certificate in order to authenticate the user with the financial institution. For example, the smart card may interface with the customer's computer system 401 through a smart card adapter, such as smart card adapter 319 in FIG. 3. During the logon process for a session with the financial institution's on-line application, the user would place the smart card in the smart card adapter of the user's computer system. Rather than maintaining a certificate for the financial institution in the certificate database of the browser, the smart card holds the certificate and passes the certificate to the computer system, and the customer interacts with the computer system's browser or other application to give input and receive output during a session with the financial institution's on-line application.

The smart card may send the digital certificate to a computer system or allow a computer system to interface with it to read the digital certificate from the smart card. In either case, the smart card digitally presents the certificate to the interfacing computer system.

When a user desires to register with the financial institution to receive a digital certificate that will be stored on the smart card, the customer presents the smart card to the customer's computer system and provides customer information through the browser or other application during the self-registration process. As the customer's computer system receives the digital certificate generated by the financial institution, the computer system may direct the certificate to be stored directly onto the smart card. At a later time, the customer presents the smart card to perform on-line financial transactions.

The customer may use the digital certificate in the smart card to perform all transactions with the financial institution, or the customer may use a certificate within a browser at some times and the smart card at other times. If the customer prefers both methods, the customer may give personal certificate identification names to the certificates to keep track of the various certificates.

In the case of smart cards, the ability to install a new certificate is more complicated than when the certificate is stored in an online database. This complication corresponds to an increase in the cost of revoking and reissuing certificates in a smart card system. The ability to render a smart card inactive for a temporary period of time provides the issuer an effective and efficient solution to numerous problems. For example, the certificate on the smart card can be 'suspended' when the available funds on the smart card have been used. The smart card can be 'refilled' with funds, and the certificate can be 'resumed' as described above, allowing the same smart card to be used multiple times.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for suspending an authentication of an identity of a user of a first computer system by a second computer system communicating with the first computer system via a communications medium, the method comprising the computer-implemented steps of:

receiving, at the second computer system, a digital certificate from the first computer system that was signed by the second computer system;

extracting a distinguished name from the received digital certificate;

searching a data structure of user information within the second computer system using the extracted distinguished name;

extracting user information from the data structure based on the extracted distinguished name; and preventing authentication of the user based on a certificate state parameter in the extracted user information that indicates a suspended state of the certificate, wherein an extension field containing the certificate state parameter is associated with a login ID stored in the user information.

2. The method of claim 1 wherein the digital certificate is formatted according to the X.509 standard.

3. The method of claim 1 wherein the data structure implements a directory service.

4. The method of claim 1 wherein the data structure implements an X.500 directory service.

5. The method of claim 1 wherein the certificate state parameter indicates a suspended state with a ":SUSPEND" string appended to a logon ID in the user information.

6. The method of claim 1 wherein a customizable web server receives the digital certificate and searches for the distinguished name in a directory in which the user's distinguished name was previously stored in response to a self-registration process.

7. The method of claim 1 wherein the certificate state parameter in the extracted user information may be removed to indicate that the digital certificate is not in a suspended state.

8. The method of claim 1, wherein the extension field is appended to the login ID.

9. A method for suspending and reinstating a digital certificate in a data processing system, the method comprising the computer-implemented steps of:

storing a suspended-certificate state parameter in a data structure in the data processing system based on a distinguished name associated with the digital certificate, wherein an extension field containing the suspended-certificate state parameter is associated with a login ID stored in the data structure; and storing a reinstated-certificate state parameter in the data structure in the data processing system based on the distinguished name associated with the digital certificate.

10. A data processing system for suspending an authentication of an identity of a user of a first computer system by a second computer system communicating with the first computer system via a communications medium, the data processing system comprising:

receiving means for receiving, at the second computer system, a digital certificate from the first computer system that was signed by the second computer system;

extracting means for extracting a distinguished name from the received digital certificate;

searching means for searching a data structure of user information within the second computer system using the extracted distinguished name;

extracting means for extracting user information from the data structure based on the extracted distinguished name; and preventing means for preventing authentication of the user based on a certificate state parameter in the extracted user information that indicates a suspended state of the certificate, wherein an extension field containing the certificate state parameter is associated with a login ID stored in the user information.

11. The data processing system of claim 10 wherein the digital certificate is formatted according to the X.509 standard.

12. The data processing system of claim 10 wherein the data structure implements a directory service.

13. The data processing system of claim 10 wherein the data structure implements an X.500 directory service.

14. The data processing system of claim 10 wherein the certificate state parameter indicates a suspended state with a ":SUSPEND" string appended to a logon ID in the user information.

15. The data processing system of claim 10, wherein the extension field is appended to the login ID.

16. A data processing system for suspending and reinstating a digital certificate, the data processing system comprising:

storing means for storing a suspended-certificate state parameter in a data structure in the data processing system based on a distinguished name associated with the digital certificate, wherein an extension field containing the suspended-certificate state parameter is associated with a login ID stored in the data structure; and storing means for storing a reinstated-certificate state parameter in the data structure in the data processing system based on the distinguished name associated with the digital certificate.

17. A computer program product in a computer readable medium for suspending an authentication of an identity of a user of a first computer system by a second computer system communicating with the first computer system via a communications medium, the computer program product comprising:

first instructions for receiving, at the second computer system, a digital certificate from the first computer system that was signed by the second computer system;

second instructions for extracting a distinguished name from the received digital certificate;

third instructions for searching a data structure of user information within the second computer system using the extracted distinguished name;

fourth instructions for extracting user information from the data structure based on the extracted distinguished name; and fifth instructions for preventing authentication of the user based on a certificate state parameter in the extracted user information that indicates a suspended state of the certificate, wherein an extension field containing the certificate state parameter is associated with a login ID stored in the user information.

18. The computer program product of claim 17, wherein the extension field is appended to the login ID.

19. A computer program product in a computer readable medium for suspending and reinstating a digital certificate, the computer program product comprising:

first instructions for storing a suspended-certificate state parameter in a data structure in the data processing system based on a distinguished name associated with the digital certificate, wherein an extension field containing the suspended-certificate state parameter is associated with a login ID stored in the data structure; and second instructions for storing a reinstated-certificate state parameter in the data structure in the data processing system based on the distinguished name associated with the digital certificate.

* * * * *